No. 817,383. PATENTED APR. 10, 1906.
G. T. McINTYRE.
APPARATUS FOR MOLDING PLASTICS.
APPLICATION FILED FEB. 17, 1905.
3 SHEETS—SHEET 2.
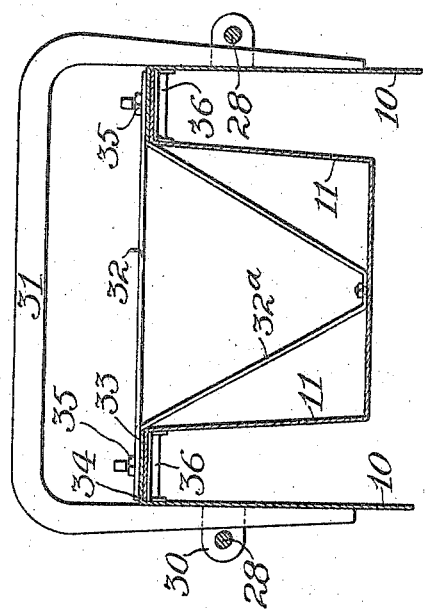
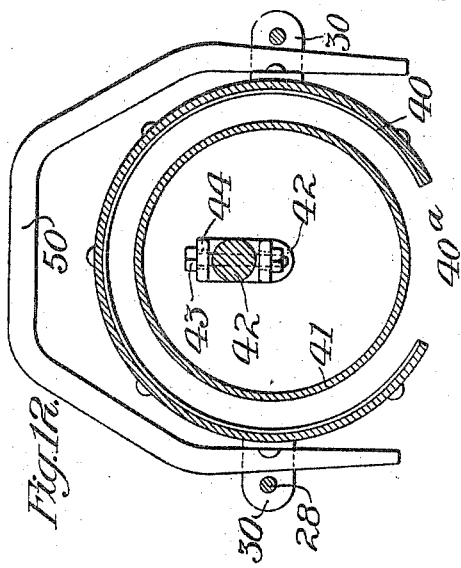
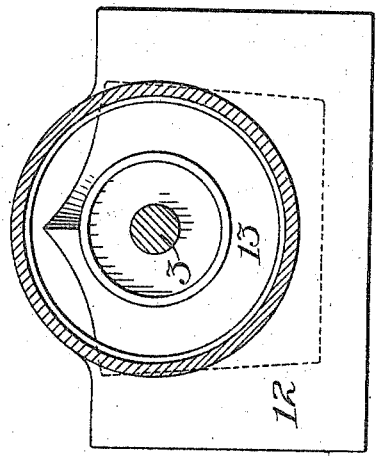
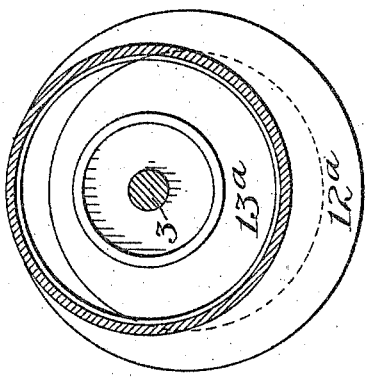
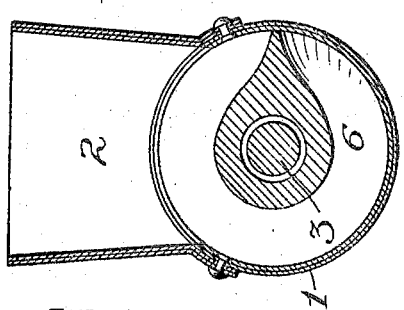
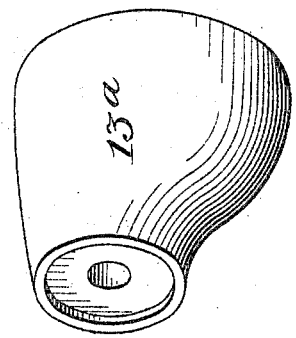
Witnesses:—
Inventor,
George T. McIntyre.
by Townsend Bros
Attys.

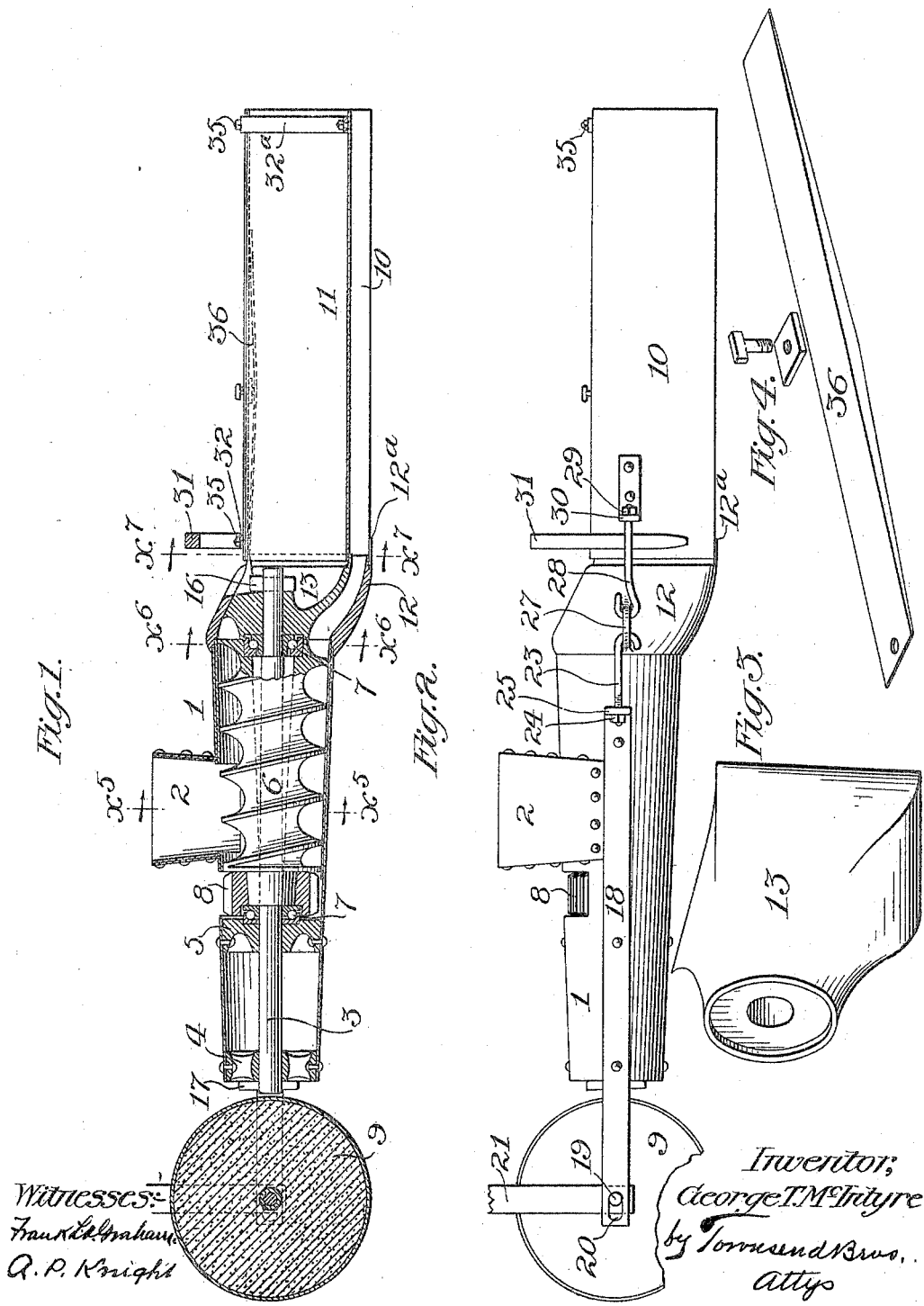

No. 817,383. PATENTED APR. 10, 1906.
G. T. McINTYRE.
APPARATUS FOR MOLDING PLASTICS.
APPLICATION FILED FEB. 17, 1905.
3 SHEETS—SHEET 3.
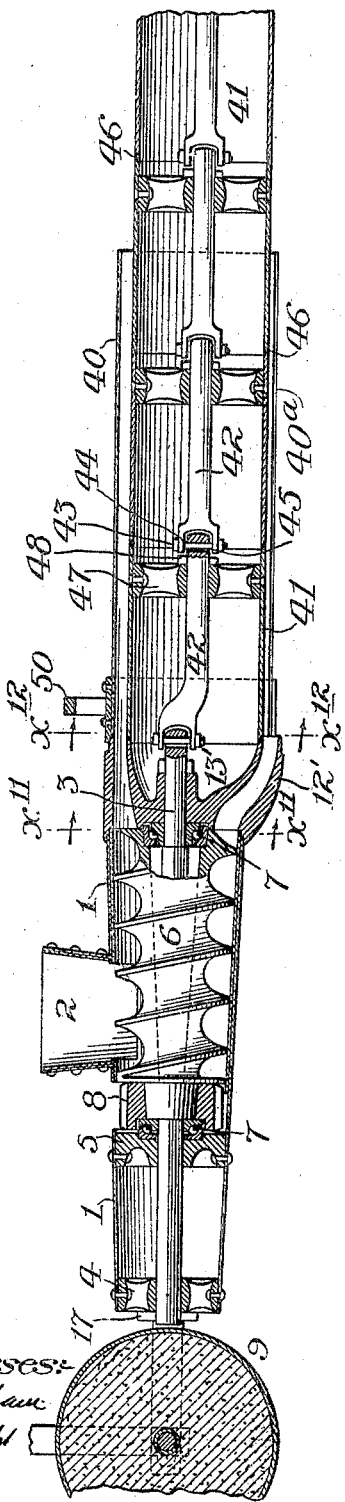
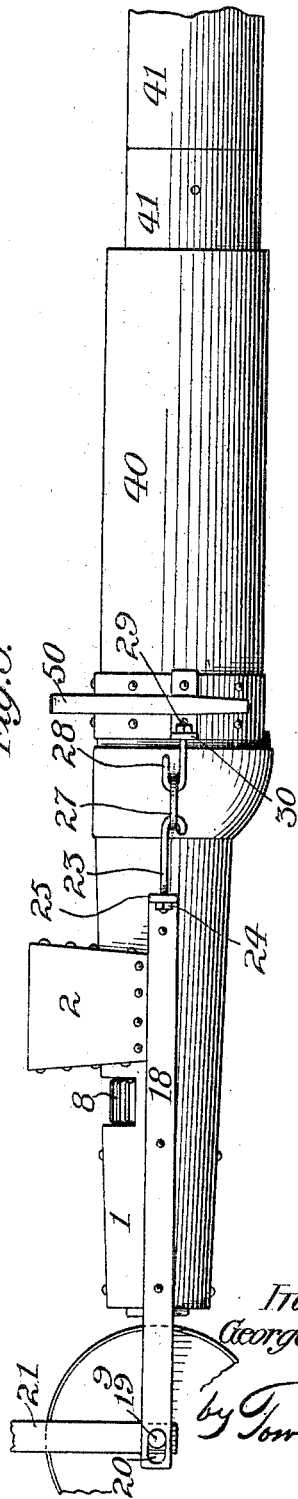
Witnesses:
Frank L. Graham
O. P. Knight
Inventor:
George T. McIntyre
by Townsend Bros
Attys

UNITED STATES PATENT OFFICE.

GEORGE T. McINTYRE, OF RIVERSIDE, CALIFORNIA.

APPARATUS FOR MOLDING PLASTICS.

No. 817,383.      Specification of Letters Patent.      Patented April 10, 1906.

Application filed February 17, 1905. Serial No. 246,141.

*To all whom it may concern:*

Be it known that I, GEORGE T. McINTYRE, a citizen of the United States, residing at Riverside, in the county of Riverside and State of California, have invented a new and useful Apparatus for Molding Plastics, of which the following is a specification.

The invention relates to an apparatus for molding plastics by a continuous process. It is particularly applicable in connection with machines for molding pipes, flumes, curbing, and the like, *in situ*, the machine traveling progressively and molding the material into the required shape as it deposits said material in place. The machine may, however, have other applications.

An important object of the invention is to provide a machine for such purposes, and generally for continuous molding of plastics, wherein frictional resistance to feeding and pressure of the plastic into the molded form will be reduced to a minimum.

Another object of the invention is to provide a machine in which various shapes of forming-molds may be applied in connection with a single feeding and forcing machine.

Another object of the invention is to provide a machine of this character wherein the feeding and pressing means will be efficiently supported in such manner as to cause minimum vibration and friction.

A further object of the invention is to provide a machine for laying conduits, flumes, and the like absolutely *in situ*, so that there is no settling or shifting of the molded material after it has been formed.

Another object of the invention is to provide a machine for this purpose which will produce substantial uniformity of the material in the upper and lower portions thereof. This is particularly applicable in connection with horizontal traveling machines of this character.

Another object of the invention is to provide a machine of this nature which will continuously mold the material in such manner as to avoid any seams, joints, or defective adherence of successively-formed portions, the whole being a continuous agglomerated mass.

Another object of the invention is to provide a machine of this nature with a former which will yield to a certain extent, so as to prevent injurious strains on the molded material—for example, by reason of curvature thereof.

A further object of the invention is to provide improved troweling means for smoothing and compacting the surface of the molded material.

Further objects and features of the invention will appear in and from the following specification and claims.

The accompanying drawings illustrate the invention.

Figure 1 is a longitudinal vertical section of a machine for forming a flume. Fig. 2 is a side elevation thereof. Fig. 3 is a perspective of the inner molding or guiding member for guiding the material from the feeding-machine into the final mold, this guide member being adapted for use with the flume-forming mold shown in Figs. 1 and 2. Fig. 4 is a perspective of the troweling device. Fig. 5 is a section on the line $x^5 \, x^5$ in Fig. 1. Fig. 6 is a section on the line $x^6 \, x^6$ in Fig. 1. Fig. 7 is a section on the line $x^7 \, x^7$ in Fig. 1. Fig. 8 is a longitudinal section of a machine adapted for molding pipe. Fig. 9 is a side view thereof. Fig. 10 is a perspective of an intermediate inner member for guiding the material from the feeding-machine into the mold shown in Figs. 8 and 9. Fig. 11 is a vertical section on the line $x^{11} \, x^{11}$, Fig. 8. Fig. 12 is a vertical section on the line $x^{12} \, x^{12}$, Fig. 8.

The apparatus comprises a mold of suitable shape, a force-feeding machine for forcibly feeding the material toward the mold, a guiding means for guiding the material from the feeding-machine into the mold. The feeding-machine is desirably of smaller cross-sectional area than the mold, and the area of the parts through which the material passes progressively increases from the charging to the discharging end, so as to minimize the friction.

Referring to Figs. 1 and 2, the feeding-machine comprises a barrel or tubular casing 1, provided with a hopper 2 for reception of the material to be molded—for example, a suitable cement or composition. A shaft or arbor 3 is mounted axially in the tubular member 1, being, for example, rigidly held in supports 4 5 at or near one end of said tubular member and extending from said supports longitudinally of the tubular casing 1.

A feeding member, preferably formed as a helix or screw 6, is mounted on the shaft or arbor 3, as by means of ball-bearings 7 at each end of the member 6. At one end the said member may have a suitable gear 8 for driving the same by any suitable motive power. (Not shown.) The tubular member or casing 1 flares or increases in diameter from the hopper end toward the delivery end and the feeding-screw 6 correspondingly increases in diameter.

9 designates a roller connected to and supporting the forward end of the casing 1 and shaft 3 in any suitable manner.

In connection with the above-described apparatus any desired molding devices may be used, the same being connected to the discharge or delivery end of the tubular casing 1 to receive the material discharged therefrom and mold it into the desired shape. Thus in Figs. 1 and 2 molding devices are shown suitable for forming an open-topped conduit or flume, said molding devices consisting of the mold proper and an intermediate guiding member for conducting the material from the feeding-machine into said mold. The mold proper comprises external and internal portions 10 11, corresponding in shape, respectively, to the outside and inside of the flume. The mold formed by said members is open at the bottom, preferably throughout—that is, from one side to the other and from end to end—so that the material formed thereby will rest entirely on the ground, the surface of the ground itself forming the bottom of the mold. The mold so formed is connected to the feeding and forcing machine by an intermediate means comprising an outer member 12, conforming at one end to the tubular casing 1 and at the other end to the external mold member 10, and an inner member 13, conforming at one end to the lesser diameter of the feed-screw 6 and at the other end to the internal mold member 11. It is desirable that the mold members 10 11, considered as a whole, should be somewhat below the level of the forcing and feeding machine, so that the direct thrust on the material from said machine will be exerted more or less in line with the upper portion of the mold, thereby condensing or compacting the material forced into the upper portion of the mold. It will be understood that the gravity of the material will insure packing in the lower part of the mold. The intermediate member 12 is therefore inclined as a whole, being higher at the machine end and lower at the mold end, and its inner and outer walls are correspondingly inclined to guide the material outward and downward from the machine to the mold. Said member 12 has a shoe or wear-plate 12$^a$ at its rear end.

Referring to the construction more in detail, the shaft-supports 4 5 in the tubular casing may be formed as spiders secured within the tubular casing and bored longitudinally for the reception of the shaft, and the intermediate member 13 may be similarly bored to receive the outer end of the shaft, key 16 and wedge 17 being driven through cross-keyways extending through the shaft, near the respective ends thereof, to bind the parts together, the member 13 being rigidly connected to the outer member 12 and the latter seating over and around the end of tubular casing 1, so that this wedge-pressure serves to bind the member 12 against the casing 1.

The screw or propelling member 6 is hollow and surrounds the shaft 3, but is out of contact therewith, rotating freely on its ball-bearings 7 at each end and being firmly supported by such bearings at each end, the shaft forming a stiff unyielding support therefor.

Side bars 18 are attached at each side of the casing 1 and are connected at their forward ends to the journals 19 of roller 9, said journals preferably engaging in slots 20 at such forward ends of side bars 18.

21 designates a member connected to said journals 19, which may be attached to suitable draft means (not shown) for pulling the machine from place to place. It will be understood that in normal operation the machine requires no draft means, as it propels itself forward by pushing on the work being formed. The latter resting on the ground serves as an effectual abutment for such propulsive action.

Suitable means are provided for drawing the mold toward the feeding-machine, so as to hold the parts together and form an integral apparatus that moves as a whole over the ground. For this purpose a screw-hook 23 engages by its nut 24 with a lug 25 on the side bar 18 at each side of the casing 1 and engages by its hooked portion at its other end with an eye or lug 27 on the outer intermediate member 12. Said eye or lug is also engaged by a screw-hook 28, whose nut 29 engages with a bracket 30 on the corresponding side of the external mold member 10.

The external mold members 10 may be held against spreading by a cross frame or yoke 31 near the forward end, and the internal mold member 11 may be provided with a transverse brace or stiffening bar 32 and 32$^a$ near each end. For forming an open-topped flume or conduit the internal mold member 11 will be substantially U-shaped, the side members of the U being bent over, as at 33, to overlap correspondingly-inturned flanges 34 on the external mold member, bolts 35 serving to secure these overlapping parts together and to the brace-bar 32. In work of this character it is sometimes desirable to trowel or finish the upper exposed edges of the flume, and for this purpose a trowel-plate 36 may be secured at the top of the upturned legs of the U-shaped mold. Said trowel-plate is desirably flat or straight at each end, as shown in Fig. 4, and bends downwardly at each side to form a shallow inverted U at the middle, the corners being rounded at such bent-down portions to give a gradual shaping or smoothing of the plastic and forming the smooth, round corners desired in such cases.

The machine as so far described is used as follows: It is drawn to the place where the work is to be performed, the mold devices being located along the line where the flume is to be laid. Feeding or force screw 6 is then set in rotation and the cement is charged into hopper 2 and passing down onto said screw is forced by the same longitudinally of the tubular casing 1 and through the intermediate guiding member 12 13 endwise into the mold 10 11. The flare or gradual increase of diameter of the tubular casing 1 causes the area through which the material passes to continually increase from the hopper to the discharge end, with the result that the friction of the material against the feeding-screw and against the walls of the tubular casing is reduced to a minimum. This increase of area is continued in the intermediate member 12 13, whose discharge end is of greater diameter or cross-sectional area than the receiving end. The feeding-machine only feeds and compresses the material into the mold, and the material is effectually mixed in the intermediate member 12 13 by reason of the curvature or deflection of the walls thereof. The material is thus packed or built up in the forward part of the mold-section 10 11 from bottom to top until the mass accumulated therein is of sufficient weight and has frictional bearing on the ground to serve as an abutment to a sufficient extent to cause the further forcing movement of the machine to propel the machine forward by pressure on such abutment. The mold should be of sufficient weight or sufficiently weighted to produce the proper pressure on the material, so that the plastic material will be densely packed into the space between the mold-sections 10 11, although it enters said sections in a comparatively loose state. The mold-section 10 11 is then drawn over the material already packed in place, this movement being gradual and continuous. In such movement the troweling devices 36 serve to smooth off the top of the said members of the flume, as above described. As the material is laid directly on the ground there is no withdrawal of the supporting members from beneath the same and no settling or shaking of the material when once formed into shape. The machine can operate continuously in this manner to lay any desired length of flume. The operation for forming a curb would be substantially identical with that above described, the mold being correspondingly shaped in obvious manner.

In using the machine for forming and laying a pipe the mold devices shown in Figs. 7, 8, 9, 10, 11, 12 will be used, the same comprising an outer mold member 40, which may be formed in cylindrical shape, being open, as shown at 40ª, along its bottom, and an inner cylindrical member 41. The member 40 need not be of any great length; but the inner member 41 should be of sufficient length to enable the cement to harden or set before said member is withdrawn from within the same, so that a support is presented within the cement tube or pipe until it is sufficiently compressed and set to support itself. To enable this to be accomplished without undue strain on the cement pipe, owing to drawing of the inner member through the same, the said inner member is preferably made in sections joined or coupled together in such manner as to allow of a certain amount of lateral pivotal movement. Each inner mold-section 41 has a central draft-bar 42, said bar 42 of the forward or first section being coupled or pivoted to the shaft 3 of the feeding-machine, and the bars 42 of the succeeding sections being each coupled at its forward end to the rear end of the draft-bar of the preceding section. Each of these couplings may consist of a pin 43, extending through eyes 44 45 in the adjacent ends of the successive draft members, the eyes in one or the other of the members being elongated to permit of a certain amount of pivotal movement in a direction transverse to the pivotal movement of the pin. Each of the tubular members 41 seats into the member in advance thereof by a bevel-joint 46, which permits of a certain amount of flexibility of the members with relation to each other. Each tubular member 41 is attached to its draft-bar 42 by a spider 47, secured by a key 48. It will be seen that in this form of molding devices the inner member is entirely distinct from the outer member, so as to permit of complete isolation of the said members by the intervening layer of cement forming the pipe, the cement passing completely around the inner mold member or form. At its forward end the inner mold member is supported by its connection with the shaft 3, which, as above described, is rigidly supported from the front end of the machine, so that the inner mold member does not rest on the cement except at its rear end, where the cement is assumed to be compressed and hardened sufficiently to support it. A yoke 50 embraces the forward end of the outer mold member 40 to hold the same from spreading. The outer tubular member 40 is connected by draft means 23 27 28 29, similar to that used with the flume-mold. Intermediate member 12' 13' is similar to the intermediate member 12 13 above described, except that the inner member 13' is not connected to the outer member 12', but rests wholly upon the shaft 3, and the molding or guiding surfaces of said intermediate member are conformed at their outer ends to the cylindrical pipe-molding sections and are therefore circular in cross-sectional form throughout, but increase or flare toward their outer or discharge end.

The mold shown in Figs. 7 and 8 may be level at its top with the top of the feed-casing 1, but its bottom is preferably below that of the casing, so that the direct thrust of the material is mainly into the upper part of the pipe, thereby producing compact formation at such upper part. The operation of this form of machine may be understood from that above described, the material being laid and formed simultaneously *in situ*, resting directly on the ground and the machine pushing itself forward by pressing on the material as an abutment. The inner mold member or core 41 is of sufficient length to continuously support the molded material for a sufficient time during such movement to prevent the pipe from collapsing or sagging by its own weight, the material being so supported until it has been sufficiently compressed and hardened to support itself. This continuous non-rotative movement of the inner mold member within the pipe of molded material smooths and packs or trowels the interior thereof.

In practice it is found that the sandy cement, which is best adapted for making water-conduits, cannot be forced through a chamber having parallel walls beyond a few inches, even when subjected to great pressure. This variety of cement does not to any great extent obey the laws of pressure governing liquids on account of the great frictional resistance to be overcome in passing it through a conveying-tube. Another difficulty to be overcome in making conduits *in situ* out of heavy cement is that the cement tends to sag down toward the bottom of the pipe-forming mold and away from the top thereof, so that the top of the conduit will not be compacted sufficiently, even when the bottom is well made. I have found that the aforementioned difficulties can be overcome by connecting the feeding device with the mold proper by a downwardly-inclined guide having a cross-sectional area, which increases toward the mold. The reasons for the advantages of such a construction seem to be shown best by Figs. 8 and 11. Fig. 11 shows a view looking in the direction that the cement moves, and referring to said figure it will be seen that the inner mold member 13ª, which forms a partial obstruction to the forward movement of the cement, lies below the center of the annular discharge-opening of the feeding device and that the cement is more free to pass directly forward into the space above the member 13ª than it is to be made to change its course and pass downwardly across a greater area of wall offering more frictional resistance thereto. It may be noted also that the upper half of the discharge-opening has only about half the space directly in front of it to discharge into that is furnished to the lower half of said discharge; but the feeding-screw delivers about the same amount at all parts of the annular discharge-opening. Therefore the top portion of the mold, since it provides less space for the material discharged, will receive the material in a more thoroughly-packed state than the bottom portion thereof, or at least there will be a sufficient tendency toward this result to offset the tendency of the heavy cement to move downwardly on account of its weight.

I do not desire to be understood as limiting my invention to a machine having a force-feeding device and independent means for guiding the material from said device into the mold, because a downwardly-inclined feeding device united directly to a mold might come within the scope of my invention.

What I claim is—

1. A machine for molding plastics comprising a casing, having a charging-opening at one end and a discharge-opening at the other end, said casing flaring from the charging to the discharging end, a force-feed device within said casing, and a mold connected to the discharging end of the casing.

2. In an apparatus for molding conduits *in situ*, the combination with a mold, of a feed device for feeding and forcing plastic material thereinto, the same comprising a tubular casing of less cross-sectional area than the mold, and an intermediate guiding means connecting the said casing with the mold, said guiding means increasing in area from the end adjacent to the casing to the end adjacent to the mold, and force-feeding means within said casing.

3. In an apparatus for molding conduits *in situ*, the combination with a mold, of a feed device for feeding and forcing plastic material thereinto, the same comprising a tubular casing of less cross-sectional area than the mold, an intermediate guiding means connecting the said casing with the mold, said guiding means increasing in area from the end adjacent to the casing to the end adjacent to the mold and descending from the feed device to the mold, and force-feeding means within said casing.

4. In an apparatus for molding plastics, in combination, a feeding-machine having a substantially horizontal casing, means for forcing plastic material longitudinally through said casing, a substantially horizontal mold, and a downwardly-inclined guiding member for conducting material from the feeding-machine to the mold.

5. In a machine for forming and laying plastic material *in situ*, the combination of a mold, a casing of smaller cross-sectional area than the mold and having a charging-opening, intermediate guiding means connecting said casing with the mold, said casing and guiding means increasing in area from the charging-opening to the mold.

6. In an apparatus adapted to form and lay conduits *in situ*, in combination, a substantially horizontal mold having an open bottom, a force-feed device having a substantially horizontal casing supported by a roller at its forward end, and a downwardly-inclined guiding member adapted to conduct material from the rear end of the feeding-machine to the forward end of the mold.

7. In a machine for molding plastics, a tubular casing provided with a charging-hopper, a hollow screw extending longitudinally thereof and rotatable therein, a shaft extending longitudinally of said casing and supported rigidly therein, and provided with bearings for the respective ends of the hollow screw.

8. In a machine for molding plastics, a tubular casing provided with a charging-hopper, a hollow screw extending longitudinally thereof and rotatable therein, a shaft extending longitudinally of said casing and supported rigidly therein and provided with bearings for the respective ends of the hollow screw, a guiding device at the discharge end of the casing having inner and outer members, the inner member having a longitudinal bore to receive such shaft, and fastening means securing said inner member to the shaft.

9. In an apparatus for molding cement conduits *in situ*, the combination with a feeding device, of a mold having its cross-sectional axis located below the cross-sectional axis of the feed device and descending guide means extending from the feeding device to the mold, the upper portion of the mold being in the direct line of thrust from the feeding device, and being supported by a roller.

10. In a machine for molding pipe, a casing provided with a charging-opening, a shaft extending longitudinally of said opening, a hollow feed-screw mounted to rotate on said shaft, a pipe-forming mold comprising an outer member connected to the casing, and an inner member connected to the said shaft and supported at its forward end thereon, leaving a free annular space between said members.

11. In a machine for molding pipe, a casing provided with a charging-opening, a shaft extending longitudinally of said opening, a hollow feed-screw mounted to rotate on said shaft, a pipe-forming mold comprising an outer member connected to the casing, an inner member connected to the said shaft and supported at its forward end thereon, leaving a free annular space between said members, the connection of the said mold to the casing and shaft consisting of outer and inner guiding members.

12. In a machine for molding pipe, a casing provided with a charging-opening, a shaft extending longitudinally of said opening, a hollow feed-screw mounted to rotate on said shaft, a pipe-forming mold comprising an outer member connected to the casing, an inner member connected to the said shaft and supported at its forward end thereon, leaving a free annular space between said members, the connection of the said mold to the casing and shaft consisting of outer and inner guiding members, the mold members having their longitudinal axis below the axis of the feed-screw.

13. In an apparatus adapted to mold conduits *in situ*, force-feeding and guiding means provided with a downwardly-inclined annular delivery increasing progressively in cross-sectional area, a roller supporting the forward end of said means, and a pipe-forming mold adapted to receive material from said delivery and comprising an outer and an inner member having an annular space therebetween, said mold being open-ended and of a size sufficient to cause the apparatus to move forward as the cement is forced thereinto.

In testimony whereof I have hereunto set my hand, at Los Angeles, California, this 6th day of February, 1905.

GEORGE T. McINTYRE.

In presence of—
ARTHUR P. KNIGHT,
EARL A. R. LYNN.